(12) United States Patent
Zhang et al.

(10) Patent No.: US 12,234,186 B2
(45) Date of Patent: Feb. 25, 2025

(54) PREPARATION METHOD OF ALUMINUM SILICATE FIBER-REINFORCED AEROGEL FELT AND IMPREGNATION REACTOR

(71) Applicant: GONG YI VAN-RESEARCH INNOVATION COMPOSITE MATERIAL CO., LTD, Zhengzhou (CN)

(72) Inventors: Jicheng Zhang, Zhengzhou (CN); Xizong Liu, Zhengzhou (CN); Dongjia Yao, Zhengzhou (CN); Dongsheng Zhang, Zhengzhou (CN); Huina Dong, Zhengzhou (CN); Zheng Wang, Zhengzhou (CN); Jing Li, Zhengzhou (CN); Shuai Chen, Zhengzhou (CN)

(73) Assignee: Gongyi Van-Research Innovation Composite Material Co., Ltd., Gongyi (CN)

( * ) Notice: Subject to any disclaimer, the term of this patent is extended or adjusted under 35 U.S.C. 154(b) by 98 days.

(21) Appl. No.: 18/015,501

(22) PCT Filed: Jul. 5, 2021

(86) PCT No.: PCT/CN2021/104435
§ 371 (c)(1),
(2) Date: Jan. 10, 2023

(87) PCT Pub. No.: WO2022/012358
PCT Pub. Date: Jan. 20, 2022

(65) Prior Publication Data
US 2023/0250020 A1 Aug. 10, 2023

(30) Foreign Application Priority Data
Jul. 11, 2020 (CN) .......................... 202010665648.6

(51) Int. Cl.
*C04B 14/46* (2006.01)
*C04B 30/02* (2006.01)
*C04B 40/00* (2006.01)

(52) U.S. Cl.
CPC .......... *C04B 14/4656* (2013.01); *C04B 30/02* (2013.01); *C04B 40/0025* (2013.01); *C04B 40/0082* (2013.01)

(58) Field of Classification Search
CPC .................................................. C04B 14/4656
See application file for complete search history.

(56) References Cited

U.S. PATENT DOCUMENTS

| 3,808,844 | A | * | 5/1974 | Oldfield | ............. | D06C 7/02 26/18.5 |
|---|---|---|---|---|---|---|
| 2014/0084132 | A1 | * | 3/2014 | Ciuperca | ............. | E04G 9/10 249/1 |
| 2018/0044561 | A1 | | 2/2018 | Goletto | | |

FOREIGN PATENT DOCUMENTS

| CN | 104742275 A | 7/2015 |
|---|---|---|
| CN | 105330212 A | 2/2016 |

(Continued)

OTHER PUBLICATIONS

CN107930979, translated abst. (Year: 2018).*

(Continued)

*Primary Examiner* — Robert A Vetere
(74) *Attorney, Agent, or Firm* — ScienBiziP, P.C.

(57) ABSTRACT

The present disclosure provides a preparation method of an aluminum silicate fiber-reinforced aerogel felt, including the following steps: mixing orthosilicate, ethanol, and water evenly, adding an NH₄F solution and ammonia water successively, and stirring evenly to obtain a silica sol; winding an aluminum silicate fiber felt into a roll and mounting on a rotatable central shaft of a impregnation reaction kettle; where a plurality of injection holes are equidistantly pro- (Continued)

vided on a surface of the reaction kettle; the central shaft of the reaction kettle drives the aluminum silicate fiber felt to rotate and slowly inject the silica sol into the surface of the fiber felt through the injection holes to conduct the impregnation; allowing the fiber felt-gel composite to stand to conduct aging; placing the aged fiber felt-gel composite in absolute ethanol to conduct solvent replacement to remove moisture; and drying to obtain the aluminum silicate fiber-reinforced aerogel felt.

6 Claims, 1 Drawing Sheet

(56) References Cited

FOREIGN PATENT DOCUMENTS

| CN | 107930979 A | * | 4/2018 | ............... B05C 3/04 |
| CN | 109400105 A | | 3/2019 | |
| CN | 111925186 A | | 11/2020 | |
| CN | 109400105 B | * | 4/2022 | ............. C04B 30/02 |
| WO | 2015016730 A2 | | 2/2015 | |

OTHER PUBLICATIONS

CN109400105B, machine translation, 2019. (Year: 2019).*
CN107930979, machine translation, 2018. (Year: 2018).*
PCT International Search Report and Written Opinion dated Oct. 9, 2021, PCT International Application No. PCT/CN2021/104435, pp. 1-11 (Including English Translation of ISR).

* cited by examiner

PREPARATION METHOD OF ALUMINUM SILICATE FIBER-REINFORCED AEROGEL FELT AND IMPREGNATION REACTOR

CROSS REFERENCE TO RELATED APPLICATION

The present application is a National Stage Application of International Application No. PCT/CN2021/104435 filed Jul. 5, 2021, which claims priority to Chinese Patent Application No. 202010665648.6 filed to the China National Intellectual Property Administration (CNIPA) on Jul. 11, 2020 and entitled "PREPARATION METHOD OF ALUMINUM SILICATE FIBER-REINFORCED AEROGEL FELT AND IMPREGNATION REACTOR", the disclosures of which are incorporated herein by reference in their entirety as part of the present application.

TECHNICAL FIELD

The present disclosure belongs to the technical field of aerogel felt preparation, and in particular relates to a preparation method of an aluminum silicate fiber-reinforced aerogel felt and an impregnation reactor used in the preparation method.

BACKGROUND

At present, the development of new energy, the improvement of utilization rate of existing energy, and the conservation of energy have attracted great attention from all countries. China is an energy-poor country, so there is of great significance to the sustainable development of Chinese society by rational use of energy and energy conservation. It is one of the most effective and economic measures to save energy through developing environmental-friendly thermal insulation materials with new technologies and processes.

$SiO_2$ aerogel, as a new super thermal insulation material, has extremely low thermal conductivity, thermal conductivity far lower than that of static air at room temperature (0.25 W/m·K), and incomparable thermal insulation effect with other materials. Moreover, the $SiO_2$ aerogel has low density, waterproof and flame-retardant properties, environmental friendliness, anti-corrosion, aging resistance, and long service life, which is called a super thermal insulation material. Currently, the aerogel is mainly used for thermal insulation in industrial pipelines, industrial furnaces, emergency cabins, transportation, household appliances, glass and other fields.

However, the porous framework of $SiO_2$ aerogel has low strength, poor toughness, and unstable mechanical structure, which seriously limiting its practical application. In view of this, the commonly used way to enhance strength and toughness is to prepare an aerogel felt/block using the aerogel and fiber felts or short fibers, whiskers, carbon nanotubes and other reinforcing materials as a framework. Fiber reinforcement is the most effective way to improve the mechanical properties of aerogel insulation materials. At present, glass fiber-reinforced aerogel felt is widely used, but can only be used in an environment of less than 400° C. to 600° C. Aerogel felts used in high temperature fields are mostly aluminum silicate fiber-reinforced aerogel felts. However, due to high brittleness and poor tensile properties of the aluminum silicate fibers, continuous mass production of such felts is hindered. The current aluminum silicate fiber-reinforced aerogel felts are mostly formed in sheet or plate shape. Since it cannot be bent during use, the aluminum silicate fiber-reinforced aerogel felt has a single form for use and cannot meet requirements in different occasions. Accordingly, on the basis of not affecting mechanical properties of the aluminum silicate fiber felt, it is one of the difficulties in current research to find a method for large-scale and continuous preparation of an aluminum silicate aerogel felt to meet the application requirements of high-temperature thermal insulation materials.

SUMMARY

A purpose of the present disclosure is to provide a preparation method of an aluminum silicate fiber-reinforced aerogel felt, solving the problems of poor mechanical properties and difficulty in large-scale and continuous preparation of aluminum silicate fiber felts.

The technical solutions adopted by the present disclosure to solve the technical problem are as follows:

The present disclosure provides a preparation method of an aluminum silicate fiber-reinforced aerogel felt, including the following steps:

(1) mixing orthosilicate, ethanol, and water evenly, adding an $NH_4F$ solution and ammonia water successively, and stirring evenly to obtain a silica sol; where, the orthosilicate, the ethanol, and water have a molar ratio of 1:(4-12):(2-4); the $NH_4F$ solution is added with a molar ratio of $NH_4F$ and the orthosilicate at (0.002-0.01):1; and the ammonia water is added with a molar ratio of $NH_3$ and the orthosilicate at (0.005-0.015):1;

(2) winding an aluminum silicate fiber felt into a roll and mounting on a rotatable central shaft of a impregnation reactor; where the central shaft is parallel to the ground and rotatable, and a plurality of injection holes are equidistantly provided on a surface of the reactor; during impregnation, the central shaft of the reactor drives the aluminum silicate fiber felt to rotate and the silica sol obtained in step (1) is slowly injected into the surface of the fiber felt through the injection holes to conduct the impregnation;

(3) allowing the fiber felt-gel composite obtained after being subjected to the impregnation in step (2) to stand to conduct aging at 30° C. to 60° C. for 8 h to 24 h;

(4) placing the fiber felt-gel composite obtained in step (3) in absolute ethanol to conduct solvent replacement multiple times to remove excess water in the fiber felt-gel composite;

(5) drying the fiber felt-gel composite obtained in step (4) to obtain the aluminum silicate fiber-reinforced aerogel felt.

In an embodiment, in step (1), the orthosilicate is one selected from the group consisting of tetraethyl orthosilicate (TEOS), tetramethyl orthosilicate (TMOS), and tetraisopropyl orthosilicate (TIPOS).

In an embodiment, in step (2), the impregnation is conducted for 12 h to 24 h.

In an embodiment, in step (4), the solvent replacement is conducted 2 to 3 times with 12 h to 36 h in each time.

In an embodiment, in step (2), the impregnation reactor includes a reactor central shaft and a reactor body, where a plurality of the injection holes are equidistantly provided on a surface of the reactor body; and an aluminum silicate fiber felt roll is wound on the reactor central shaft.

In an embodiment, the reactor body has an inner diameter 1.2 to 1.5 times an outer diameter of the aluminum silicate fiber felt roll.

The present disclosure has the following beneficial effects:

The present disclosure provides a preparation method of an aluminum silicate fiber-reinforced aerogel felt. A fiber felt is wound on a central shaft of an impregnation reactor, the reactor is set parallel to the ground, and the fiber felt is subjected to impregnation through injection holes while rotating. Through this process, uniform and gentle impregnation of the aluminum silicate fiber felt can be achieved, avoiding easy swelling of the silicate fiber felt when directly pressing and immersing for gel injection by traditional methods. Due to high brittleness and poor mechanical properties of the aluminum silicate fiber felt, the gel solution flowing during the traditional impregnation can cause a certain degree of impact on the felt body, resulting in breakage of the aluminum silicate fiber felt, which affects use effect and performance of the fiber felt.

In the present disclosure, under the premise of not destroying a structure of the aluminum silicate fiber felt, mass production of the fiber-reinforced aerogel felt into rolls is realized; the obtained roll-shaped fiber felts can be made into a sheet or a plate according to actual needs through flattening or the like. The preparation method has simple and convenient operation, strong controllability, and high efficiency. The prepared aluminum silicate fiber felt can meet the demand for thermal insulation materials in the high-temperature fields.

DETAILED DESCRIPTION OF THE EMBODIMENTS

The present disclosure will be further described below in conjunction with specific examples and the accompanying drawings. It should be understood that these examples are only intended to describe the present disclosure, rather than to limit the scope of the present disclosure.

EXAMPLE 1

A preparation method of an aluminum silicate fiber-reinforced aerogel felt included the following steps:
(1) TEOS, ethanol, and water were mixed evenly, an $NH_4F$ solution and ammonia water were added successively, and stirred evenly to obtain a silica sol; where the TEOS, the ethanol, and water had a molar ratio of 1:5:2; the $NH_4F$ solution was added with a molar ratio of $NH_4F$ and the TEOS at 0.003:1; and the ammonia water was added with a molar ratio of $NH_3$ and the TEOS at 0.006:1;
(2) an aluminum silicate fiber felt was wound into a roll and mounted on a rotatable central shaft of a impregnation reactor; where the central shaft was parallel to the ground and rotatable, and a plurality of injection holes were equidistantly provided on a surface of the during impregnation, the central shaft of the reactor drove the aluminum silicate fiber felt to rotate and slowly inject the silica sol obtained in step (1) is slowly injected into the surface of the fiber felt through the injection holes to conduct the impregnation;
(3) the fiber felt-gel composite obtained after being subjected to the impregnation in step (2) was allowed to stand to conduct aging at 30° C. for 20 h;
(4) the fiber felt-gel composite obtained in step (3) was placed in absolute ethanol to conduct solvent replacement multiple times to remove excess water in the fiber felt-gel composite; and
(5) the fiber felt-gel composite obtained in step (4) was dried to obtain the aluminum silicate fiber-reinforced aerogel felt.

In step (2), the impregnation was conducted for 15 h.

In step (4), the solvent replacement was conducted 2 times with 16 h in each time.

Figure 1:
FIG. 1 shows a structural schematic diagram of an impregnation reactor in the present disclosure.
Figure 2:
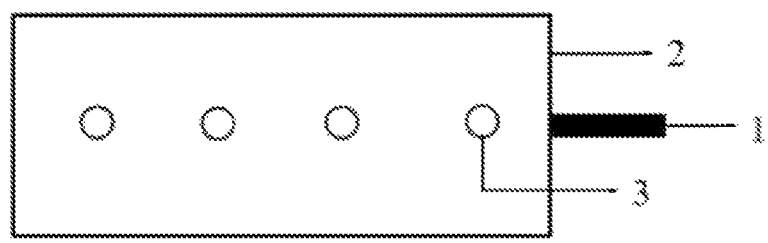
FIG. 2 shows a top view of FIG. 1.
Figure 3:
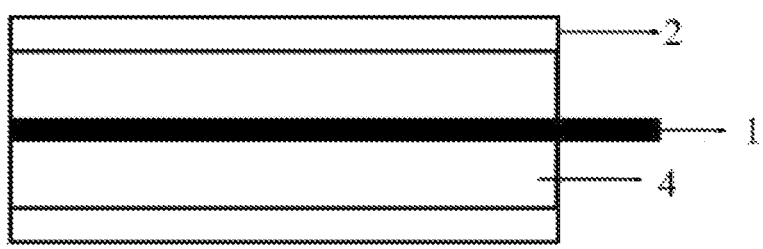
FIG. 3 shows a plane view of FIG. 1 along a direction of a central shaft; where in the figure: 1 is a central shaft, 2 is a reactor body, 3 is an injection hole, and 4 is a fiber felt roll.

In step (2), referring to FIG. 1, FIG. 2, and FIG. 3, the impregnation reactor included a reactor central shaft (1) and a reactor body (2), where a plurality of the injection holes (3) were equidistantly provided on a surface of the reactor body (2); and an aluminum silicate fiber felt roll (4) was wound on the reactor central shaft (1); and the reactor body (2) had an inner diameter 1.2 times an outer diameter of the aluminum silicate fiber felt roll (4).

EXAMPLE 2

A preparation method of an aluminum silicate fiber-reinforced aerogel felt included the following steps:
(1) TMOS, ethanol, and water were mixed evenly, an $NH_4F$ solution and ammonia water were added successively, and stirred evenly to obtain a silica sol; where the TMOS, the ethanol, and water had a molar ratio of 1:5:2; the $NH_4F$ solution was added with a molar ratio of $NH_4F$ and the TMOS at 0.005:1; and the ammonia water was added with a molar ratio of $NH_3$ and the TMOS at 0.008:1;
(2) an aluminum silicate fiber felt was wound into a roll and mounted on a rotatable central shaft of a impregnation reactor; where the central shaft was parallel to the ground and rotatable, and a plurality of injection holes were equidistantly provided on a surface of the reactor; during impregnation, the central shaft of the reactor drove the aluminum silicate fiber felt to rotate and slowly inject the silica sol obtained in step (1) is slowly injected into the surface of the fiber felt through the injection holes to conduct the impregnation;
(3) the fiber felt-gel composite obtained after being subjected to the impregnation in step (2) was allowed to stand to conduct aging at 40° C. for 22 h;
(4) the fiber felt-gel composite obtained in step (3) was placed in absolute ethanol to conduct solvent replacement multiple times to remove excess water in the fiber felt-gel composite; and
(5) the fiber felt-gel composite obtained in step (4) was dried to obtain the aluminum silicate fiber-reinforced aerogel felt.

In step (2), the impregnation was conducted for 18 h.

In step (4), the solvent replacement was conducted 3 times with 15 h in each time.

In step (2), referring to FIG. 1, FIG. 2, and FIG. 3, the impregnation reactor included a reactor central shaft (1) and a reactor body (2), where a plurality of the injection holes (3) were equidistantly provided on a surface of the reactor body (2); and an aluminum silicate fiber felt roll (4) was wound on the reactor central shaft (1); and the reactor body (2) had an inner diameter 1.3 times an outer diameter of the aluminum silicate fiber felt roll (4).

EXAMPLE 3

A preparation method of an aluminum silicate fiber-reinforced aerogel felt included the following steps:

(1) TIPOS, ethanol, and water were mixed evenly, an $NH_4F$ solution and ammonia water were added successively, and stirred evenly to obtain a silica sol; where the TIPOS, the ethanol, and water had a molar ratio of 1:8:4; the $NH_4F$ solution was added with a molar ratio of $NH_4F$ and the TIPOS at 0.006:1; and the ammonia water was added with a molar ratio of $NH_3$ and the TIPOS at 0.009:1;

(2) an aluminum silicate fiber felt was wound into a roll and mounted on a rotatable central shaft of a impregnation reactor; where, the central shaft was parallel to the ground and rotatable, and a plurality of injection holes were equidistantly provided on a surface of the reactor; during impregnation, the central shaft of the reactor drove the aluminum silicate fiber felt to rotate and slowly inject the silica sol obtained in step (1) is slowly injected into the surface of the fiber felt through the injection holes to conduct the impregnation;

(3) the fiber felt-gel composite obtained after being subjected to the impregnation in step (2) was allowed to stand to conduct aging at 50° C. for 12 h;

(4) the fiber felt-gel composite obtained in step (3) was placed in absolute ethanol to conduct solvent replacement multiple times to remove excess water in the fiber felt-gel composite; and (5) the fiber felt-gel composite obtained in step (4) was dried to obtain the aluminum silicate fiber-reinforced aerogel felt.

In step (2), the impregnation was conducted for 20 h.

In step (4), the solvent replacement was conducted 2 times with 19 h in each time.

In step (2), referring to FIG. 1, FIG. 2, and FIG. 3, the impregnation reactor included a reactor central shaft (1) and a reactor body (2), where a plurality of the injection holes (3) were equidistantly provided on a surface of the reactor body (2); and an aluminum silicate fiber felt roll (4) was wound on the reactor central shaft (1); and the reactor body (2) had an inner diameter 1.4 times an outer diameter of the aluminum silicate fiber felt roll (4).

EXAMPLE 4

A preparation method of an aluminum silicate fiber-reinforced aerogel felt included the following steps:

(1) TMOS, ethanol, and water were mixed evenly, an $NH_4F$ solution and ammonia water were added successively, and stirred evenly to obtain a silica sol; where the TMOS, the ethanol, and water had a molar ratio of 1:9:3; the $NH_4F$ solution was added with a molar ratio of $NH_4F$ and the TMOS at 0.008:1; and the ammonia water was added with a molar ratio of $NH_3$ and the TMOS at 0.012:1;

(2) an aluminum silicate fiber felt was wound into a roll and mounted on a rotatable central shaft of a impregnation reactor; where the central shaft was parallel to the ground and rotatable, and a plurality of injection holes were equidistantly provided on a surface of the reactor; during impregnation, the central shaft of the reactor drove the aluminum silicate fiber felt to rotate and slowly inject the silica sol obtained in step (1) is slowly injected into the surface of the fiber felt through the injection holes to conduct the impregnation;

(3) the fiber felt-gel composite obtained after being subjected to the impregnation in step (2) was allowed to stand to conduct aging at 55° C. for 8 h;

(4) the fiber felt-gel composite obtained in step (3) was placed in absolute ethanol to conduct solvent replacement multiple times to remove excess water in the fiber felt-gel composite; and (5) the fiber felt-gel composite obtained in step (4) was dried to obtain the aluminum silicate fiber-reinforced aerogel felt.

In step (2), the impregnation was conducted for 21 h.

In step (4), the solvent replacement was conducted 3 times with 32 h in each time.

In step (2), referring to FIG. 1, FIG. 2, and FIG. 3, the impregnation reactor included a reactor central shaft (1) and a reactor body (2), where a plurality of the injection holes (3) were equidistantly provided on a surface of the reactor body (2); and an aluminum silicate fiber felt roll (4) was wound on the reactor central shaft (1); and the reactor body (2) had an inner diameter 1.5 times an outer diameter of the aluminum silicate fiber felt roll (4).

EXAMPLE 5

A preparation method of an aluminum silicate fiber-reinforced aerogel felt included the following steps:

(1) TEOS, ethanol, and water were mixed evenly, an $NH_4F$ solution and ammonia water were added successively, and stirred evenly to obtain a silica sol; where the TEOS, the ethanol, and water had a molar ratio of 1:7:3; the $NH_4F$ solution was added with a molar ratio of $NH_4F$ and the TEOS at 0.007:1; and the ammonia water was added with a molar ratio of $NH_3$ and the TEOS at 0.013:1;

(2) an aluminum silicate fiber felt was wound into a roll and mounted on a rotatable central shaft of a impregnation reactor; where the central shaft was parallel to the ground and rotatable, and a plurality of injection holes were equidistantly provided on a surface of the reactor; during impregnation, the central shaft of the reactor drove the aluminum silicate fiber felt to rotate and slowly inject the silica sol obtained in step (1) is slowly injected into the surface of the fiber felt through the injection holes to conduct the impregnation;

(3) the fiber felt-gel composite obtained after being subjected to the impregnation in step (2) was allowed to stand to conduct aging at 60° C. for 15 h;

(4) the fiber felt-gel composite obtained in step (3) was placed in absolute ethanol to conduct solvent replacement multiple times to remove excess water in the fiber felt-gel composite; and (5) the fiber felt-gel composite obtained in step (4) was dried to obtain the aluminum silicate fiber-reinforced aerogel felt.

In step (2), the impregnation was conducted for 15 h.

In step (4), the solvent replacement was conducted 2 times with 25 h in each time.

In step (2), referring to FIG. 1, FIG. 2, and FIG. 3, the impregnation reactor included a reactor central shaft (1) and a reactor body (2), where a plurality of the injection holes (3) were equidistantly provided on a surface of the reactor body (2); and an aluminum silicate fiber felt roll (4) was wound on the reactor central shaft (1); and the reactor body (2) had an inner diameter 1.3 times an outer diameter of the aluminum silicate fiber felt roll (4).

EXAMPLE 6

A preparation method of an aluminum silicate fiber-reinforced aerogel felt included the following steps:

(1) TIPOS, ethanol, and water were mixed evenly, an $NH_4F$ solution and ammonia water were added successively, and stirred evenly to obtain a silica sol; where the TIPOS, the ethanol, and water had a molar ratio of 1:10:4; the $NH_4F$ solution was added with a molar ratio of $NH_4F$ and the TIPOS at 0.009:1; and the ammonia water was added with a molar ratio of $NH_3$ and the TWOS at 0.007:1;

(2) an aluminum silicate fiber felt was wound into a roll and mounted on a rotatable central shaft of a rotatable impregnation reactor; where the central shaft was parallel to the ground and rotatable, and a plurality of injection holes were equidistantly provided on a surface of the reactor; during impregnation, the central shaft of the reactor drove the aluminum silicate fiber felt to rotate and slowly inject the silica sol obtained in step (1) is slowly injected into the surface of the fiber felt through the injection holes to conduct the impregnation;

(3) the fiber felt-gel composite obtained after being subjected to the impregnation in step (2) was allowed to stand to conduct aging at 50° C. for 20 h;

(4) the fiber felt-gel composite obtained in step (3) was placed in absolute ethanol to conduct solvent replacement multiple times to remove excess water in the fiber felt-gel composite; and (5) the fiber felt-gel composite obtained in step (4) was dried to obtain the aluminum silicate fiber-reinforced aerogel felt.

In step (2), the impregnation was conducted for 20 h.

In step (4), the solvent replacement was conducted 2 times with 20 h in each time.

In step (2), referring to FIG. 1, FIG. 2, and FIG. 3, the impregnation reactor included a reactor central shaft (1) and a reactor body (2), where a plurality of the injection holes (3) were equidistantly provided on a surface of the reactor body (2); and an aluminum silicate fiber felt roll (4) was wound on the reactor central shaft (1); and the reactor body (2) had an inner diameter 1.4 times an outer diameter of the aluminum silicate fiber felt roll (4).

The above examples are merely preferred examples of the present disclosure and are not intended to limit the present disclosure, and various changes and modifications may be made to the present disclosure by those skilled in the art. Any modification, equivalent substitution, improvement and the like made within the spirit and principle of the present disclosure shall fall within the protection scope of the present disclosure.

What is claimed is:

1. A preparation method of an aluminum silicate fiber-reinforced aerogel felt, comprising:
   (1) mixing orthosilicate, ethanol, and water evenly, adding an NH4F solution and ammonia water successively, and stirring evenly to obtain a silica sol; wherein the orthosilicate, the ethanol, and water have a molar ratio of 1:(4-12):(2-4); the $NH_4F$ solution is added with a molar ratio of $NH_4F$ and the orthosilicate at (0.002-0.01):1; and the ammonia water is added with a molar ratio of $NH_3$ and the orthosilicate at (0.005-0.015):1;
   (2) winding an aluminum silicate fiber felt into a roll and mounting on a rotatable central shaft of a reaction kettle; wherein the central shaft is parallel to the ground and rotatable, and a plurality of injection holes are provided on a surface of the reaction kettle;
   rotating the central shaft to drive the aluminum silicate fiber felt to rotate, and injecting the silica sol into the reaction kettle through the plurality of injection holes to impregnate the aluminum silicate fiber felt, a fiber felt-gel composite being obtained after the aluminum silicate fiber felt being impregnated;
   (3) making the fiber felt-gel composite obtained in (2) to stand to conduct aging at 30° C. to 60° C. for 8 h to 24 h;
   (4) placing the fiber felt-gel composite obtained in (3) in absolute ethanol to conduct solvent replacement multiple times to remove excess water in the fiber felt-gel composite; and
   (5) drying the fiber felt-gel composite obtained in (4) to obtain the aluminum silicate fiber-reinforced aerogel felt.

2. The preparation method of an aluminum silicate fiber-reinforced aerogel felt according to claim 1, wherein in (1), the orthosilicate is one selected from the group consisting of tetraethyl orthosilicate (TEOS), tetramethyl orthosilicate (TMOS), and tetraisopropyl orthosilicate (TIPOS).

3. The preparation method of an aluminum silicate fiber-reinforced aerogel felt according to claim 1, wherein in (2), the impregnation is conducted for 12 h to 24 h.

4. The preparation method of an aluminum silicate fiber-reinforced aerogel felt according to claim 1, wherein in (4), the solvent replacement is conducted 2 to 3 times with 12 h to 36 h in each time.

5. The preparation method of an aluminum silicate fiber-reinforced aerogel felt according to claim 1, wherein the reaction kettle comprises a body of the reaction kettle and the central shaft in the body of the reaction kettle, the plurality of injection holes are equidistantly provided on a surface of the body of the reaction kettle; and an aluminum silicate fiber felt roll is wound on the central shaft of the reaction kettle.

6. The preparation method of an aluminum silicate fiber-reinforced aerogel felt according to claim 5, wherein the body of the reaction kettle has an inner diameter 1.2 to 1.5 times an outer diameter of the aluminum silicate fiber felt roll.

* * * * *